UNITED STATES PATENT OFFICE.

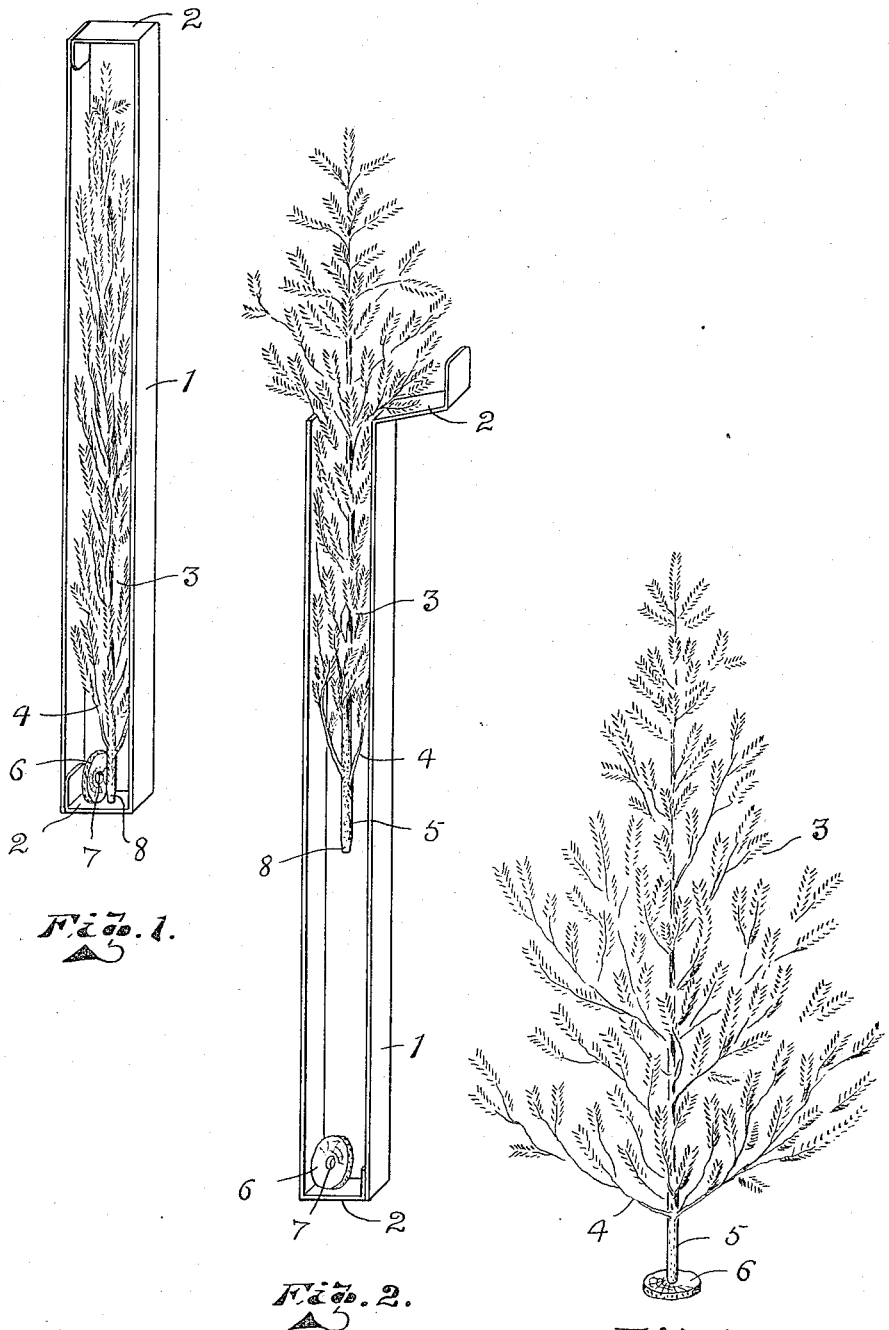

GEORGE SCHLECHT, OF SMITHVILLE, MINNESOTA.

METHOD OF MARKETING TREES.

1,150,708.  Specification of Letters Patent.  Patented Aug. 17, 1915.

Application filed March 9, 1914. Serial No. 823,396.

*To all whom it may concern:*

Be it known that I, GEORGE SCHLECHT, a citizen of the United States, residing at Smithville, in the county of St. Louis and State of Minnesota, have invented certain new and useful Improvements in Methods of Marketing Trees, of which the following is a specification, reference being had therein to the accompanying drawing.

My invention relates to improvements in the method of marketing trees and more particularly to such a method, whereby felled trees are placed in cold storage for the purposes hereinafter described and set forth, and then removed and placed within a rigid-walled receptacle and disposed of as a commercial commodity.

With this object in view, the invention consists in certain novel features of construction and combination of parts as are hereinafter set forth and pointed out in the claim.

In the accompanying drawings: Figure 1 is a perspective view of my receptacle with the tree contained therein, shown with the front of the receptacle removed. Fig. 2 is a similar view of the receptacle, with one end open and showing the method of placing the tree into the same. Fig. 3 shows the tree removed and placed upon its standard.

It has been established that evergreen trees placed in cold storage and frozen and later thawed out are much more flexible than prior to such treatment. This is supposedly for the reason that the expansion occasioned by the freezing process more thoroughly impregnates the structure of the tree with the moisture and resinous matter held therein. It is a part of my method to preferably subject evergreen trees to such treatment, although it is understood this treatment may be dispensed with if it is so desired.

Referring now to the drawings in which like reference numerals designate similar parts, I provide a receptacle 1 which has elongated rigid walls. Both of the ends 2 of the receptacle 1 are easily accessible for the confining and withdrawing of the tree when it is so desired. As heretofore described, the trees, when taken from cold storage and thawed are in a relatively limber or flexible condition. Therefore, when the tree 3 is drawn into the receptacle, butt end first, through one end, the naturally radially arranged branches of the tree will be pressed close to the trunk of the tree as they enter, without disturbing their radial arrangement by so doing. The danger of fracturing the branches of the tree is reduced to a minimum by the aforedescribed process of preparation. This is clearly illustrated in Fig. 2. As is clearly shown in Figs. 1 and 2 the branches 4—4 of the tree 3 will assume a position substantially parallel with the trunk 5 thereof. When it is desired to withdraw the tree from the confining receptacle 1, the same may be accomplished by drawing it from the opposite end of the receptacle. This will cause no additional pressure to be exerted upon the branches of the tree and it may be withdrawn in-tact. A tree so treated and handled will, within a very short time, assume its former natural condition, and each branch will tend to assume its proper and natural position with relation to the trunk of the tree. It is also a part of my method and purpose to place within each receptacle a suitable base 6. This base 6 is preferably of a cylindrical form and cut from the trunk of a tree in its natural state, so that the bark will remain about the edges thereof so as to produce a harmonious artistic effect in conjunction with the natural tree. The base 6 is provided with a hole 7 sufficiently large to accommodate the tapered base 8 of the trunk 5 in such a manner that the tree will be held in an upright position for holiday or other decorative purposes. It is evident that with this method of packing and transportation, the tree may be removed at any time for examination by withdrawing it from one end of the receptacle and replacing it through the opposite end. It is also preferable that the shape of the receptacle in cross section be either square or circular so that the natural symmetry of the tree should not be destroyed. Furthermore I prefer to coat the interior of the receptacle with a paraffin or graphite preparation to exclude the air and smooth the surface for convenience in applying and removing the tree. I also prefer, when necessary, to seal the closed ends of the package by dipping it into a suitable sealing compound.

No claim is made herein for the commercial article including the box and the tree with or without its base, as this will form the subject-matter of a separate application.

Having fully described my invention what

I claim and desire to secure by Letters Patent is:

The herein described method of preparing and marketing trees, which consists in first making the limbs of the tree flexible by freezing and then thawing the tree, and then flexing the limbs of the tree adjacent its trunk and rigidly holding the limbs in said flexed positions for shipping and marketing the tree.

In testimony whereof I hereunto affix my signature in the presence of two witnesses.

GEORGE SCHLECHT.

Witnesses:
F. B. CORNWALL,
HENRY E. MARSCHALK.